US010652890B1

(12) United States Patent
Oroskar et al.

(10) Patent No.: US 10,652,890 B1
(45) Date of Patent: May 12, 2020

(54) SELECTING A PRIMARY CARRIER FOR A HIGH POWER CLASS WIRELESS DEVICE (71) Applicant: Sprint Spectrum LP, Overland Park, KS (US)

(72) Inventors: Siddharth Oroskar, Overland Park, KS (US); Jasinder Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 12 days.

(21) Appl. No.: 15/792,196

(22) Filed: Oct. 24, 2017

(51) Int. Cl.
*H04W 72/04* (2009.01)
*H04L 5/00* (2006.01)
*H04L 5/14* (2006.01)

(52) U.S. Cl.
CPC ......... *H04W 72/0453* (2013.01); *H04L 5/001* (2013.01); *H04L 5/14* (2013.01); *H04W 72/048* (2013.01)

(58) Field of Classification Search
None
See application file for complete search history.

(56) References Cited

U.S. PATENT DOCUMENTS

| | | | | |
|---|---|---|---|---|
| 2002/0105913 A1* | 8/2002 | Miya | ..................... | H04W 36/30 370/241 |
| 2009/0163210 A1* | 6/2009 | Abedi | .................. | H04W 16/14 455/436 |
| 2010/0309864 A1* | 12/2010 | Tamaki | ................. | H04W 52/42 370/329 |
| 2014/0036743 A1* | 2/2014 | Olfat | ................. | H04W 72/0453 370/281 |
| 2015/0117247 A1* | 4/2015 | Wang | .................... | H04W 24/08 370/252 |
| 2015/0141014 A1 | 5/2015 | Huang et al. | | |
| 2015/0173009 A1 | 6/2015 | Vallath et al. | | |
| 2015/0181590 A1* | 6/2015 | Park | ...................... | H04L 1/1812 370/280 |
| 2016/0119883 A1* | 4/2016 | Lee | ..................... | H04W 52/146 370/329 |
| 2016/0205632 A1* | 7/2016 | Yi | ....................... | H04W 52/146 455/522 |
| 2016/0270047 A1 | 9/2016 | Kazmi et al. | | |

FOREIGN PATENT DOCUMENTS

GB       2376606 A   * 12/2002   ............ H04W 16/14

* cited by examiner

Primary Examiner — Sai Aung
Assistant Examiner — Richard Schnell (57) ABSTRACT

Performing carrier aggregation for high-powered wireless devices that may cause interference to other wireless devices includes determining that a wireless device attached to an access node is assigned to a high power class and capable of operating in a carrier aggregation mode, initiating the carrier aggregation mode for the wireless device, and instructing the access node to utilize a frequency-division-duplexing (FDD) carrier deployed by the access node as a primary carrier for the wireless device. A handover of the wireless device to the FDD carrier may be triggered by a threshold level of interference caused by uplink transmissions from the wireless device when operating in the high-powered transmission mode on a TDD carrier.

20 Claims, 6 Drawing Sheets

SELECTING A PRIMARY CARRIER FOR A HIGH POWER CLASS WIRELESS DEVICE

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmit power that is higher than a current maximum allowable transmit power of off-the-shelf wireless devices and/or other currently deployed low power wireless devices. As shown in Table 1 below, the maximum allowable transmit power for wireless devices can be defined by the power class of the wireless device.

TABLE 1

| Operating Band | Power Class 1 Wireless Device Power (dBm) | Tol. (dB) | Power Class 2 Wireless Device Power (dBm) | Tol. (dB) | Power Class 3 Wireless Device Power (dBm) | Tol. (dB) | Power Class 4 Wireless Device Power (dBm) | Tol. (dB) |
|---|---|---|---|---|---|---|---|---|
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmit power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other low-power wireless devices are currently defined in LTE as power class 3 and/or power class 4 wireless devices. Power class 3 and/or power class 4 low-power wireless devices (hereinafter referred to as standard or low-powered wireless devices, with the terms "standard" and "low" being equivalent and defined as any power level that is not "high") can be configured with a maximum allowable transmit power level of +23 dBm for frequency bands I-III with a nominal power tolerance of ±2 dB (e.g., for E-UTRA bands). High-power class wireless devices (hereinafter referred to as high-powered wireless device) are currently defined as power class 1 or power class 2 wireless devices. Power class 1 and/or power class 2 high-power class wireless devices can be configured with a maximum allowable transmit power level of +26 dBm for frequency bands I-II with a nominal power tolerance ±2 dB (e.g., for E-UTRA bands), as illustrated in Table 1.

Further, high-powered wireless devices may cause undesirable interference to other wireless devices operating within the wireless network, particularly to standard-powered wireless devices that are utilizing the same frequency band or sub-band as the high-powered wireless devices, or when wireless devices of both high and standard power classes are configured to utilize the same duplexing method, such as time-division-duplexing (TDD).

OVERVIEW

Exemplary embodiments described herein include systems, methods, and processing nodes for performing carrier aggregation for high-powered wireless devices that may cause interference to other wireless devices. An exemplary method described herein for performing carrier aggregation, the method comprising determining that a wireless device attached to an access node is assigned to a high power class and capable of operating in a carrier aggregation mode, initiating the carrier aggregation mode for the wireless device, and instructing the access node to utilize a frequency-division-duplexing (FDD) carrier deployed by the access node as a primary carrier for the wireless device.

Exemplary systems described herein for performing carrier aggregation in a wireless network include an access node configured to deploy a frequency-division-duplexing (FDD) carrier and at least one time-division-duplexing (TDD) carrier, and a processing node communicably coupled to the access node. The processing node is configured to perform operations comprising identifying a high-powered wireless device attached to the access node, determining that the high-powered wireless device capable of operating in a carrier aggregation mode, and instructing the access node to communicate with the wireless device in the carrier aggregation mode utilizing the FDD carrier as a primary carrier.

An exemplary processing node described herein for performing carrier aggregation in a wireless network is configured to perform operations comprising determining that uplink transmissions from a high-powered wireless device attached to an access node are causing an interference to one or more standard-powered wireless devices, wherein the high-powered wireless device and the one or more standard-powered wireless devices are attached to a time-division-duplexing (TDD) carrier deployed by the access node, triggering a handover of the high-powered wireless device to a frequency-division-duplexing (FDD) carrier deployed by the access node, and instructing the access node and the high-powered wireless device to utilize resources of the FDD and the TDD carriers.

DETAILED DESCRIPTION

Exemplary embodiments described herein include systems, methods, and processing nodes for selecting a primary carrier for wireless devices assigned to a high power class and capable of operating in a carrier aggregation mode. As described herein, uplink transmissions from high-powered wireless devices may cause interference to other wireless devices in the network, particularly those operating using the same carrier as the high-powered wireless device, or on a carrier utilizing the same frequency band and/or the same duplexing method. For example, a first type of carrier and a second type of carrier may be deployed within a wireless network. The first and second type may include different types of duplexing modes. Carriers of the first type may be deployed by the first access node using a frequency division duplexing (FDD) mode, and carriers of the second type may be deployed by the second access node using a time division duplexing (TDD) mode. For example, within a long-term evolution (LTE) system, the first type of carrier may include a FDD-LTE carrier, and the second type of carrier may include a TD-LTE carrier. Further, access nodes described herein may deploy more than one of each type of carrier, such as more than one FDD carrier, and more than one TDD carrier.

Further, high-powered wireless devices described herein may be attached to at least one TDD carrier out of the numerous other carriers deployed by an access node. Since TDD carriers utilize the same frequencies for uplink and downlink channels (with channels separated only by time stamps), high-powered wireless devices attached to a TDD carrier and capable of carrier aggregation may be configured to instead utilize an FDD carrier as a primary carrier. For example, a presence of a high-powered wireless device may be determined, along with a capability of the high-powered wireless device to engage in carrier aggregation. The carrier aggregation mode enables the high-powered wireless device to communicate with a serving access node using a combination of resources from at least two carriers, such as the FDD carrier as a primary carrier, and one or more additional TDD carriers as secondary carriers. In embodiments described herein, the FDD carrier may be used to transmit control signals, and/or uplink transmissions, thereby minimizing the potential interference caused by these signals and transmissions to other wireless device in the network.

In another exemplary embodiment, handover to the FDD carrier may be based on a measured level of interference. Upon determining that uplink transmissions from a high-powered wireless device attached to an access node are causing an interference to one or more standard-powered wireless devices, the high-powered wireless device may be handed over to an FDD carrier as described herein. Triggering the handover is performed upon the interference meeting a threshold interference. In either case, upon performing the handover of the high-powered wireless device to an FDD carrier (at least, for transmission of control signals), the high-powered wireless device and/or the serving access node may be instructed to operate in carrier aggregation mode, i.e. to utilize resources from more than one carrier to enable communication. Further, the high-powered wireless device and/or the access node may be configured to utilize one or more TDD carriers as a secondary carrier.

In an exemplary embodiment, identifying the high-powered wireless device comprises obtaining a power class of the high-powered wireless device. For example, the high-powered wireless devices may be any wireless devices that are assigned to a high power class. The high power class enables the wireless device to utilize a transmission power level that is higher than a standard transmission power level utilized by other wireless devices assigned to a standard power class. Further, the wireless devices may be capable of operating in a carrier aggregation mode. Operations described herein include determining that the wireless device is assigned to the high power class based on device capabilities received from the wireless device. For example, the device capabilities may be part of an attach request received by the wireless network from the wireless device. Similarly, determining a carrier-aggregation capability of the wireless device may be based on a capability report in the attach request, or any other source of information related to attributes of the high-powered wireless devices.

Triggering the handover of the wireless device to the FDD carrier may include adjusting one or more handover thresholds for the high-powered wireless device. For example, the handover thresholds may be adjusted such that the high-powered wireless device is encouraged to initiate a handover to the FDD carrier. Adjusting the handover threshold may include increasing or raising a threshold signal level associated with the TDD carrier, such that a measured signal level of the TDD carrier becomes less than a minimum threshold level required for the high-powered wireless device to stay attached to the TDD carrier. Further, the adjustment may comprise decreasing or lowering a threshold signal level of the FDD carrier, such that a measured signal level of the FDD carrier becomes higher than a minimum threshold level required for the high-powered wireless device to request the handover. The adjusted handover thresholds may be transmitted to the high-powered wireless device via a control message by one or more access nodes deploying the first and second carriers. The high-powered wireless device may report signal level measurements of different carriers, and handovers performed or prevented based on the updated thresholds. Further, in addition to the systems described herein, these operations may be implemented as computer-readable instructions or methods, and processing nodes on the network for executing the instructions or methods. These and other embodiments are further described herein and with reference to FIGS. 1-7.

Figure 1:
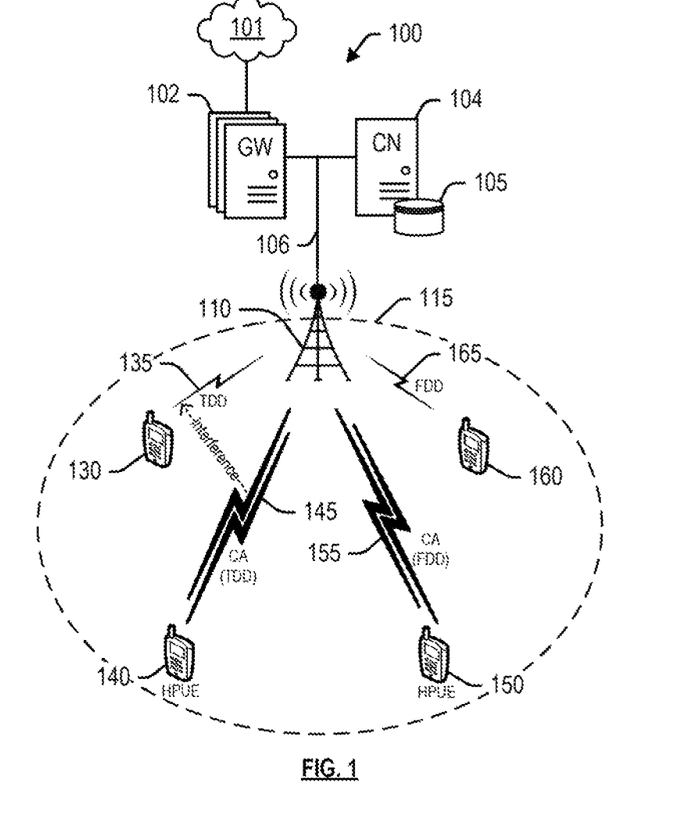
FIG. 1 depicts an exemplary system for selecting a primary carrier for high-powered wireless devices in a wireless network.

FIG. 1 depicts an exemplary system 100 comprising a communication network 101, gateway 102, controller node 104, access node 110, and wireless devices 130, 140, 150, 160. In this exemplary embodiment, access node 110 may be a macrocell access node configured to deploy at least two different carriers, each of which utilizes a different frequency band or sub-band. In an exemplary embodiment, the two different carriers may be deployed using different types of multiplexing modes. For example, a first carrier may be deployed by access node 110 in a TD-LTE mode, and a second carrier may be deployed by access node 110 in a FDD-LTE mode. Thus, in an embodiment, access node 110 may comprise two co-located cells, or antenna/transceiver combinations that are mounted on the same structure. In other embodiments, any other combination of access nodes and carriers deployed therefrom may be evident to those having ordinary skill in the art in light of this disclosure.

Wireless devices 130, 140, 150, 160 are illustrated as being in communication with access node 110 over various types of communication links. For example, wireless device 130 is illustrated as being in communication with access node 110 over a TDD communication link 135. TDD communication link 135 may comprise any communication channel that utilizes air-interface resources of a TDD carrier deployed by access node 110. Further, wireless devices 140 and 150 are illustrated as being in communication with access node 110 over communication links 145 and 155 respectively. Communication links 145 and 155 include high-powered transmissions from wireless devices 140, 150 respectively. For example, wireless devices 140, 150 may be assigned to a high power class, which enables wireless device 132 to utilize a transmission power level that is higher than a standard transmission power level utilized by other wireless devices assigned to a standard power class. Utilizing the higher transmission power level enables wireless devices 140, 150 to communicate with access node 110 while being located at an edge of coverage area 115.

Further, communication links 145 and 155 utilize a carrier aggregation operating mode, i.e. they utilize wireless air interface resources from more than one carrier. For example, communication link 145 may utilize air-interface resources of at least one TDD carrier and at least another carrier, including any TDD or FDD carrier. The at least one TDD carrier is utilized as a primary carrier; thus communication link 145 is identified as a CA (TDD) communication link. Similarly, communication link 155 may utilize air-interface resources of at least one FDD carrier and at least another carrier, including any TDD or FDD carrier. The at least one FDD carrier is utilized as a primary carrier; thus communication link 155 is identified as a CA (FDD) communication link. Finally, wireless device 160 is illustrated as being in communication with access node 110 over an FDD communication link 165. FDD communication link 165 may comprise any communication channel that utilizes air-interface resources of an FDD carrier deployed by access node 110.

Further, uplink or control signals transmitted using a TDD carrier as the primary carrier and in a high-powered transmission mode, may interfere with other standard-powered transmissions utilizing the same frequency band/sub-band or duplexing mode. For example, uplink or control signals transmitted from high-powered wireless device 140 on communication link 145 may interfere with communication link 135, thereby potentially reducing a quality of service or causing other issues to standard-powered wireless device 130. Therefore, access node 110, a processing node communicatively coupled to access node 110, or any other node within system 100, may be configured to select a new primary carrier for high-powered wireless device 140 that does not cause interference with other wireless devices. For example high-powered wireless device 140 may be configured to utilize the FDD carrier as the primary carrier, similar to high-powered wireless device 150. Further, access node 110 may be configured to identify any wireless device that is assigned to a high power class and capable of carrier aggregation, and select an FDD carrier as a primary carrier for such wireless devices. Such capabilities of high-powered transmission and carrier aggregation may be determined by system 100 based on an attach request or a capability report within an attach request transmitted from each wireless device 130, 140, 150, 160, or from any other source of information related to attributes of wireless devices stored on, for instance, database 105.

In another exemplary embodiment, handover to the FDD carrier may be based on a measured level of interference. Upon determining that uplink transmissions from high-powered wireless device 140 are causing a threshold level of interference to standard-powered wireless device 130, high-powered wireless device 140 may be handed over to an FDD carrier as described herein. Upon performing the handover of high-powered wireless device 140 to an FDD carrier (at least, for transmission of control signals, similar to high-powered wireless device 150), high-powered wireless device 140 and/or access node 110 may be instructed to operate in carrier aggregation mode, i.e. to utilize resources from both the primary FDD carrier as well as one or more secondary carriers (either FDD or TDD) to enable communication therebetween.

Access node 110 can be any network node configured to provide communication between wireless devices 130, 140, 150, 160 and communication network 101, including standard access nodes such as a macro-cell access node, base transceiver station, a radio base station, an eNodeB device, an enhanced eNodeB device, or the like. In an exemplary embodiment, a macro-cell access node can have a coverage area 115 in the range of approximately five kilometers to thirty-five kilometers and an output power in the tens of watts. Alternatively, access node 110 may comprise a short range, low power, small-cell access node such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Wireless devices 130, 140, 150, 160 may be any device, system, combination of devices, or other such communication platform capable of communicating wirelessly with access node 110 using one or more frequency bands deployed therefrom. Each of wireless devices 130, 140, 150, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140, 150, 160. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as types and duplexing methods of carriers deployed by access node 110, power classes and carrier aggregation capabilities of wireless devices 130, 140, 150, 160, associations therebetween. This information may be requested by or shared with access node 110 via communication links 106, 107, ×2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
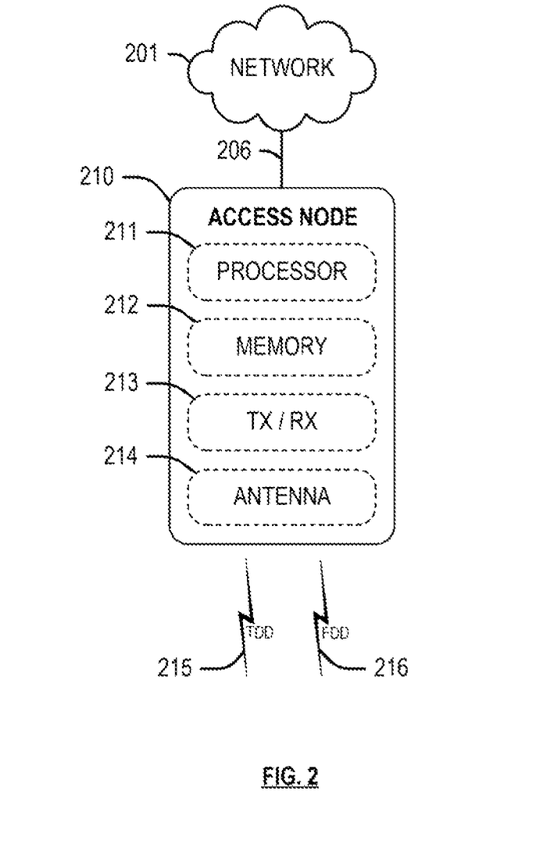
FIG. 2 depicts an exemplary access node.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, and antenna 214. Processor 211 executes instructions stored on memory 212, while transceiver 213 and antenna 214 enable wireless communication with other network nodes, such as wireless devices and relay nodes. For example, access node 210 may be configured to deploy at least two different carriers 215, 216 utilizing different frequency bands or sub-bands, and different types of multiplexing modes. For example, a first carrier 215 utilizing a first frequency may be deployed by access node 210 in a TD-LTE mode, and a second carrier 216 utilizing a second frequency may be deployed by access node 210 in a FDD-LTE mode. These features may be enabled by access node 210 comprising two co-located cells, or antenna/transceiver combinations that are mounted on the same structure.

Further, instructions stored on memory 212 can include instructions for determining a presence of a high-powered wireless device along with a capability of the high-powered wireless device to engage in carrier aggregation. The carrier aggregation mode enables the high-powered wireless device to communicate with access node 210 using a combination of resources from both carriers 215 and 216. Determining that the wireless device is assigned to the high power class may be based on device capabilities received from the wireless device. For example, the device capabilities may be part of an attach request received by access node 210. Similarly, determining a carrier-aggregation capability of the wireless device may be based on a capability report in the attach request, or any other source of information related to attributes of the high-powered wireless devices.

Upon determining that the high-powered wireless device is attached to a TDD carrier and may potentially be causing an interference to other wireless devices, the high-powered wireless device may be handed to FDD carrier 216, and to operate in carrier aggregation mode utilizing resources FDD carrier 215 as the primary carrier for uplink and/or control signal transmissions, and TDD carrier 216 as a secondary carrier for data transmissions. Triggering the handover of the wireless device to FDD carrier 216 may include adjusting one or more handover thresholds for the high-powered wireless device. For example, the handover thresholds may be adjusted such that the high-powered wireless device is encouraged to initiate a handover to FDD carrier 216. Adjusting the handover threshold may include increasing or raising a threshold signal level associated with TDD carrier 215, such that a measured signal level of TDD carrier 215 becomes less than a minimum threshold level required for the high-powered wireless device to stay attached to TDD carrier 215. Further, the adjustment may comprise decreasing or lowering a threshold signal level of FDD carrier 216, such that a measured signal level of FDD carrier 216 becomes higher than a minimum threshold level required for the high-powered wireless device to request the handover. The adjusted handover thresholds may be transmitted to the high-powered wireless device via a control message by access node 210. The high-powered wireless device may report signal level measurements of different carriers, and handovers performed or prevented based on the updated thresholds.

Figure 3:
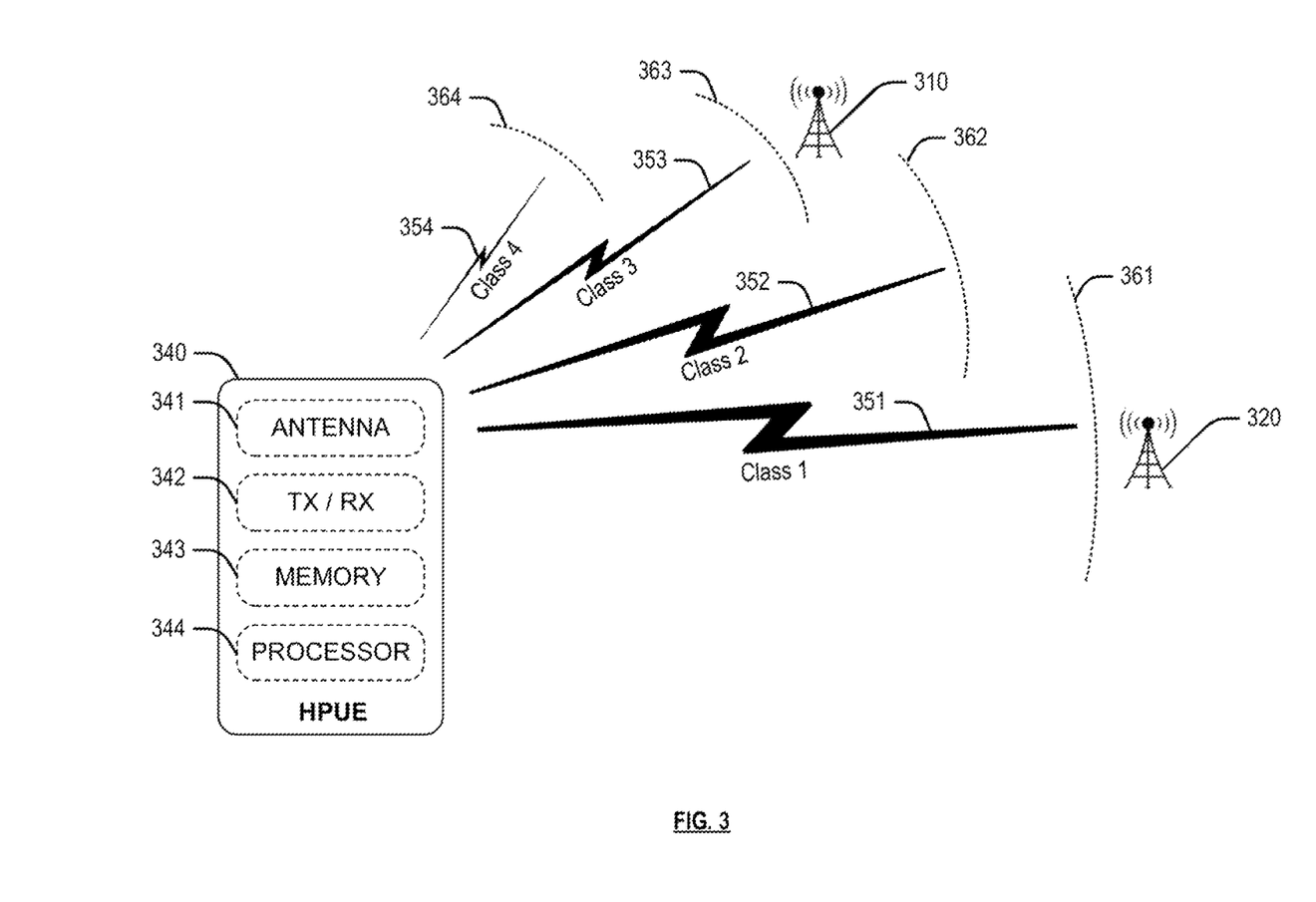
FIG. 3 depicts an exemplary wireless device capable of transmitting using different power classes.

FIG. 3 depicts an exemplary high-powered wireless device or high-powered user equipment (HPUE) 340, which is capable of transmission in several power classes. As noted above, wireless devices can be configured as different power class wireless devices (e.g., high-power wireless devices and/or standard-power wireless devices as well as low-power wireless devices). Wireless device 340 is therefore equipped with an appropriate antenna 341 and transceiver 342 enabling increased transmit power from wireless device 340 to one or more access node 310, 320. For example, wireless device 340 is capable of operating in a transmission mode utilizing power class 1, to transmit an uplink transmission 351 at a range 361. Wireless device 340 may further switch transmission modes to utilizing power class 2 to transmit uplink transmission 352 at a range 362, utilizing power class 3 to transmit uplink transmission 353 at a range 363, and utilizing power class 4 to transmit uplink transmission 354 at a range 364. Antenna 341 and transceiver 342 are appropriately configured to utilize these differently-powered transmission modes. Further, an effective coverage area of an access node can be limited by an amount of power available to a wireless device, enabling wireless devices capable of utilizing high-power transmission modes to communicate with access nodes from a longer distance than standard-power wireless devices. In other words, effective coverage areas of access nodes 310, 320 can change dynamically based on a transmit power level of uplink transmissions 351, 352, 353, 354. Consequently, real-time adjustment of the power classes of wireless devices can be performed by network operators to increase the effective coverage area of their access nodes, enabling more consumers will to use a given access node. For example, to enable communication with access node 320 from a long distance (such as an edge of a coverage area), wireless device 340 may be configured to transmit uplink transmissions 351 utilizing a high-power transmission mode such as power class 1. Alternatively, to enable communication with access node 310 from a short distance, wireless device 340 may be configured to transmit uplink transmissions 351 utilizing a standard-power transmission mode such as power class 3. Moreover, controlling the transmit power level or changing the power class of wireless devices can be performed by setting a maximum uplink transmission power value allowed by the serving access node to be equal to a standard maximum uplink transmission power value, and broadcasting the maximum uplink transmission power value to the wireless device via, for example, a system information message.

Figure 4:
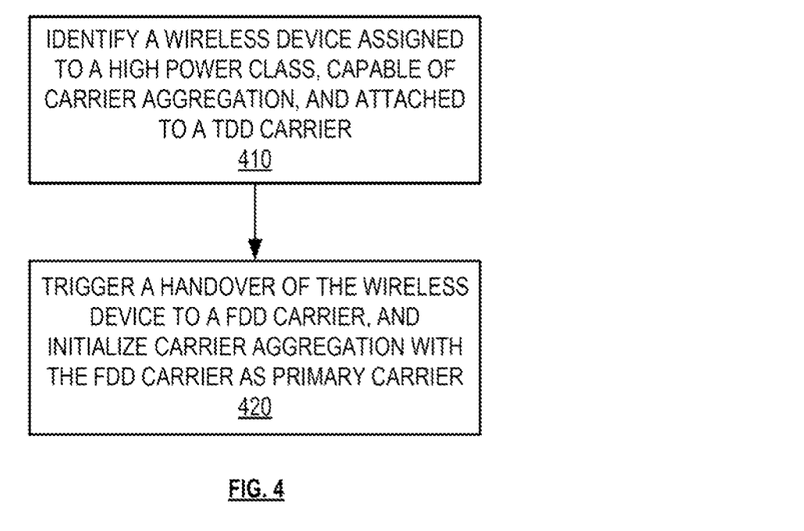
FIG. 4 depicts an exemplary method for selecting a primary carrier for high-powered wireless devices in a wireless network.

FIG. 4 depicts an exemplary method for selecting a primary carrier for high-powered wireless devices in a wireless network. The method of FIG. 4 may be implemented by an access node (such as access node 110, 210), by a controller node (such as controller node 104), or by any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, wireless devices operating in a high-powered transmission mode and capable of carrier aggregation are identified. For example, a wireless device attached to a first carrier in a wireless network may be assigned to a high power class, which enables the wireless device to utilize a transmission power level that is higher than a standard transmission power level utilized by other wireless devices assigned to a standard power class.

Further, as described herein, uplink transmissions from high-powered wireless devices may cause interference to other wireless devices in the network, particularly those operating using the same carrier as the high-powered wireless device, or on a carrier utilizing the same frequency band and/or the same duplexing method. For example, a first type of carrier and a second type of carrier may be deployed within a wireless network. The first and second type may include different types of duplexing modes. Carriers of the first type may be deployed by the first access node using a frequency division duplexing (FDD) mode, and carriers of the second type may be deployed by the second access node using a time division duplexing (TDD) mode. For example, within a long-term evolution (LTE) system, the first type of carrier may include a FDD-LTE carrier, and the second type of carrier may include a TD-LTE carrier. Further, access nodes described herein may deploy more than one of each type of carrier, such as more than one FDD carrier, and more than one TDD carrier. Further, the wireless device may be capable of operating in a carrier aggregation mode. Such capabilities of high-powered transmission and carrier aggregation may be determined at 410 based on, for instance, an attach request or a capability report within the attach request transmitted from the wireless device or from any other source of information related to attributes of the high-powered wireless devices. The high-powered wireless device may be attached to at least one TDD carrier out of the numerous other carriers deployed by an access node.

Once a wireless device is identified as a high-powered wireless device capable of carrier aggregation then, at 420, the wireless device may be handed over to an FDD carrier, and to initialize carrier aggregation with the FDD carrier as a primary carrier. The carrier aggregation mode enables the high-powered wireless device to communicate with the serving access node using a combination of resources from at least two carriers, such as the FDD carrier as a primary carrier, and one or more additional TDD carriers as secondary carriers. For example, since TDD carriers utilize the same frequencies for uplink and downlink channels (with channels separated only by time stamps), high-powered wireless devices attached to a TDD carrier and capable of carrier aggregation may be configured to instead utilize an FDD carrier as a primary carrier. In embodiments described herein, the FDD carrier may be used to transmit control signals, and/or uplink transmissions, thereby minimizing the potential interference caused by these signals and transmissions to other wireless device in the network.

Triggering the handover of the wireless device to the FDD carrier may include adjusting one or more handover thresholds for the high-powered wireless device. For example, the handover thresholds may be adjusted such that the high-powered wireless device is encouraged to initiate a handover to the FDD carrier. Adjusting the handover threshold may include increasing or raising a threshold signal level associated with the TDD carrier, such that a measured signal level of the TDD carrier becomes less than a minimum threshold level required for the high-powered wireless device to stay attached to the TDD carrier. Further, the adjustment may comprise decreasing or lowering a threshold signal level of the FDD carrier, such that a measured signal level of the FDD carrier becomes higher than a minimum threshold level required for the high-powered wireless device to request the handover. The adjusted handover thresholds may be transmitted to the high-powered wireless device via a control message by one or more access nodes deploying the first and second carriers. The high-powered wireless device may report signal level measurements of different carriers, and handovers performed or prevented based on the updated thresholds.

Figure 5:
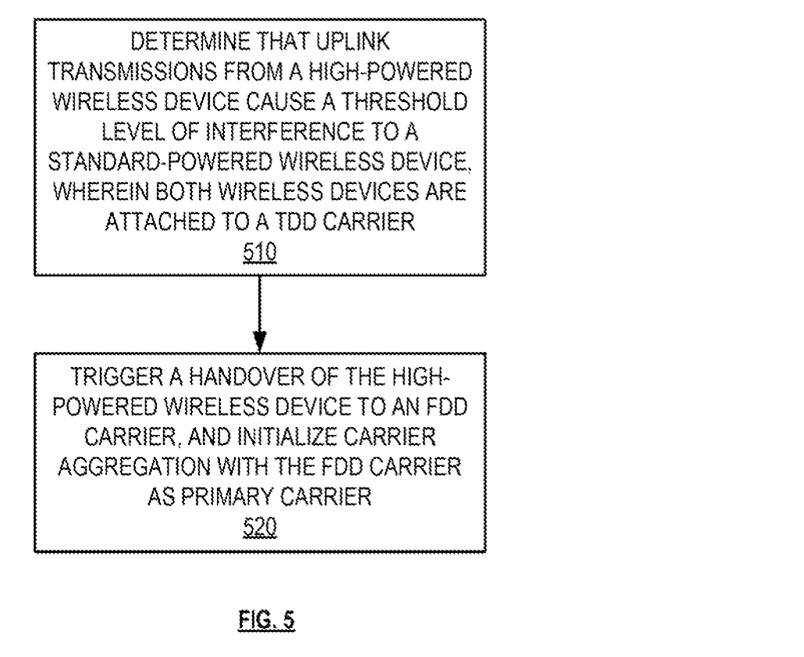
FIG. 5 depicts another exemplary method for selecting a primary carrier for high-powered wireless devices in a wireless network based on a threshold level of interference.

Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, a wireless device may be handed over from a first carrier based on a triggered A5 event. Here, a received first signal level plus a hysteresis may be compared to a first threshold and a received second signal level plus offsets minus a hysteresis may be compared to a second threshold. The first received signal level may comprise a received signal level from the first carrier and the second received signal level may comprise a received signal level from a second (or target) carrier, where the first and seconds signals are received at the wireless device. Some example signal levels may comprise a Received Signal Strength Indicator, (RSSI), Reference Signal Received Quality (RSRQ), RSRP, or any other suitable signal level FIG. 5 depicts another exemplary method for selecting a primary carrier for high-powered wireless devices in a wireless network based on a threshold level of interference. The method of FIG. 5 may be implemented by an access node (such as access node 110, 210), by a controller node (such as controller node 104), or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, it is determined that uplink transmissions from a high-powered wireless device attached to an access node are causing an interference to one or more standard-powered wireless devices. For example, a wireless device attached to a first carrier in a wireless network may be assigned to a high power class, which enables the wireless device to utilize a transmission power level that is higher than a standard transmission power level utilized by other wireless devices assigned to a standard power class. Further, as described herein, uplink transmissions from high-powered wireless devices may cause interference to other wireless devices in the network, particularly those operating using the same carrier as the high-powered wireless device, or on a carrier utilizing the same frequency band and/or the same duplexing method. For example, a first type of carrier and a second type of carrier may be deployed within a wireless network. The first and second type may include different types of duplexing modes. Carriers of the first type may be deployed by the first access node using a frequency division duplexing (FDD) mode, and carriers of the second type may be deployed by the second access node using a time division duplexing (TDD) mode. For example, within a long-term evolution (LTE) system, the first type of carrier may include a FDD-LTE carrier, and the second type of carrier may include a TD-LTE carrier. Further, access nodes described herein may deploy more than one of each type of carrier, such as more than one FDD carrier, and more than one TDD carrier. The high-powered wireless device may be attached to at least one TDD carrier out of the numerous other carriers deployed by an access node, thereby causing interference to other wireless device attached to one or more TDD carriers.

Upon identifying the threshold level of interference, at 520, the high-powered wireless device may be handed over to an FDD carrier, and to initialize carrier aggregation with the FDD carrier as a primary carrier. The carrier aggregation mode enables the high-powered wireless device to communicate with the serving access node using a combination of resources from at least two carriers, such as the FDD carrier as a primary carrier, and one or more additional TDD carriers as secondary carriers. For example, since TDD carriers utilize the same frequencies for uplink and downlink channels (with channels separated only by time stamps), high-powered wireless devices attached to a TDD carrier and capable of carrier aggregation may be configured to instead utilize an FDD carrier as a primary carrier. In embodiments described herein, the FDD carrier may be used to transmit control signals, and/or uplink transmissions, thereby minimizing the potential interference caused by these signals and transmissions to other wireless device in the network. Triggering the handover of the wireless device to the FDD carrier may include adjusting one or more handover thresholds for the high-powered wireless device. For example, the handover thresholds may be adjusted such that the high-powered wireless device is encouraged to initiate a handover to the FDD carrier. Adjusting the handover threshold may include increasing or raising a threshold signal level associated with the TDD carrier, such that a measured signal level of the TDD carrier becomes less than a minimum threshold level required for the high-powered wireless device to stay attached to the TDD carrier. Further, the adjustment may comprise decreasing or lowering a threshold signal level of the FDD carrier, such that a measured signal level of the FDD carrier becomes higher than a minimum threshold level required for the high-powered wireless device to request the handover. The adjusted handover thresholds may be transmitted to the high-powered wireless device via a control message by one or more access nodes deploying the first and second carriers. The high-powered wireless device may report signal level measurements of different carriers, and handovers performed or prevented based on the updated thresholds.

Figure 6A:
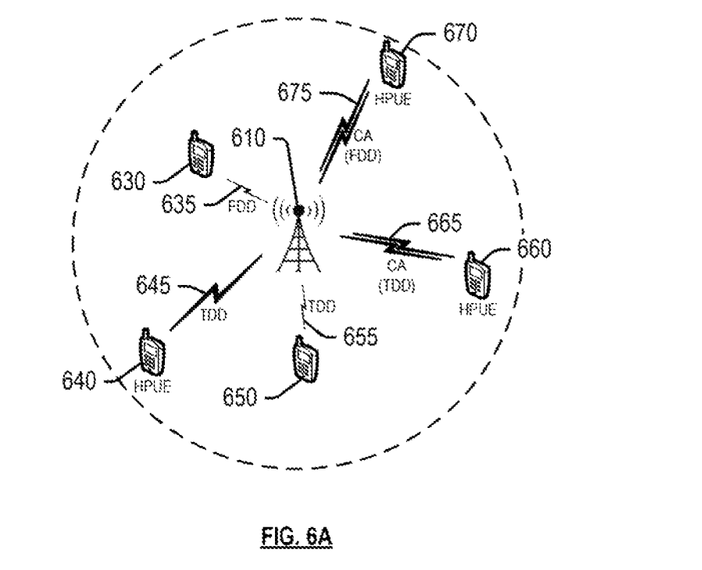
FIGS. 6A-6B depict exemplary selections of primary carriers for high-powered wireless devices attached to an access node.
Figure 6B:
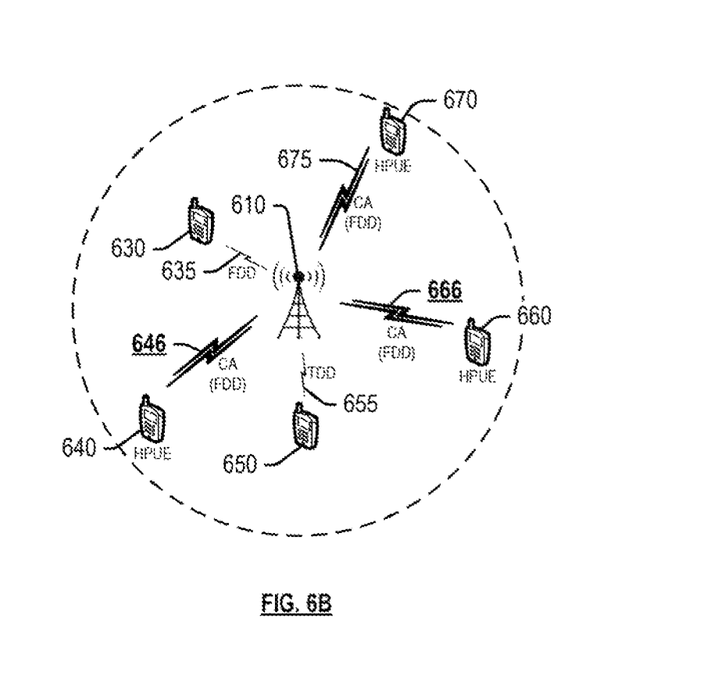

Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, a wireless device may be handed over from a first carrier based on a triggered A5 event. Here, a received first signal level plus a hysteresis may be compared to a first threshold and a received second signal level plus offsets minus a hysteresis may be compared to a second threshold. The first received signal level may comprise a received signal level from the first carrier and the second received signal level may comprise a received signal level from a second (or target) carrier, where the first and seconds signals are received at the wireless device. Some example signal levels may comprise a Received Signal Strength Indicator, (RSSI), Reference Signal Received Quality (RSRQ), RSRP, or any other suitable signal level FIGS. 6A-6B depict exemplary selections of primary carriers for high-powered wireless devices attached to an access node. With reference to FIG. 6A, an access node 610 is configured to provide network access to wireless devices 630, 640, 650, 660, and 670 via a plurality of FDD and TDD carriers in various combinations. Similar to access node 110 in FIG. 1, access node 610 may be a macrocell access node configured to deploy at least two different carriers, each of which utilizes a different frequency band or sub-band. The two different carriers may be deployed using different types of multiplexing modes. For example, access node 610 is illustrated as deploying carrier 635 in an FDD mode, and a second carrier 655 in a TDD mode. Further, wireless device 630 is illustrated as being in communication with access node 610 over a standard-powered FDD communication link 635, wireless device 640 is illustrated as being in communication with access node 640 over a high-powered TDD communication link 645, wireless device 650 is illustrated as being in communication with access node 610 over a standard-powered TDD communication link 655, and wireless devices 660 and 670 are illustrated as being in communication with access node 610 utilizing high-powered carrier aggregated links 665 and 675, respectively. Thus, it is evident that at least wireless devices 640, 660, and 670 are assigned to a high power class, which enables these wireless devices to utilize a transmission power level that is higher than a standard transmission power level utilized by other wireless devices assigned to a standard power class. Further, communication link 665 is illustrated as utilizing the resources of at least one TDD carrier and another carrier, including any TDD or FDD carrier. The at least one TDD carrier is utilized as a primary carrier; thus communication link 665 is identified as a CA (TDD) communication link. Similarly, communication link 675 may utilize air-interface resources of at least one FDD carrier and at least another carrier, including any TDD or FDD carrier. The at least one FDD carrier is utilized as a primary carrier; thus communication link 675 is identified as a CA (FDD) communication link.

Moreover, as described herein, uplink or control signals transmitted using any high-powered TDD carrier (including TDD carrier 645, and aggregated carrier 665 utilizing the TDD carrier as the primary carrier) may interfere with other standard-powered transmissions utilizing the same frequency band/sub-band or duplexing mode, such as transmissions to/from wireless device 650 using TDD carrier 655, thereby potentially reducing a quality of service or causing other issues to a user of wireless device 650. Therefore, access node 610, a processing node communicatively coupled to access node 610, or any other node in communication with access node 610 (not shown herein), may be configured to select a new primary carrier for at least high-powered wireless devices 640 and 660, as depicted in FIG. 6B. In FIG. 6B, the results are illustrated of a handover of high-powered wireless devices 640 and 660 to an FDD carrier as a primary carrier. For example, high-powered wireless device 640 is configured to utilize an aggregated carrier 646, which utilizes the FDD carrier as the primary carrier, similar to high-powered wireless device 670. Further, high-powered wireless device 660 is configured to utilize the FDD carrier as the primary carrier.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, controller node 104, and/or network 101.

Figure 7:
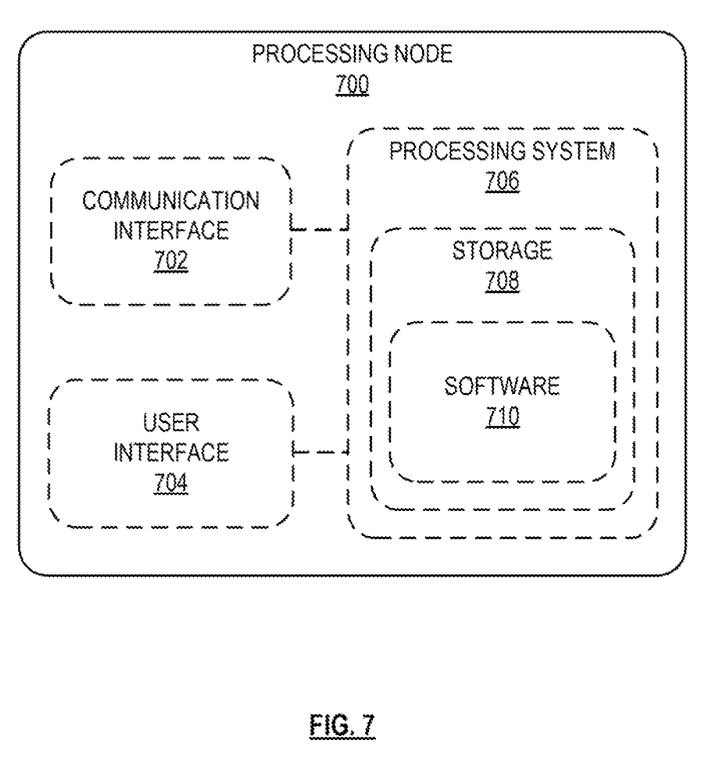
FIG. 7 depicts an exemplary processing node for selecting a primary carrier for high-powered wireless devices in a wireless network.

FIG. 7 depicts an exemplary processing node for performing carrier aggregation based on control channel load levels. Processing node 700 comprises a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a module for performing transmission power control operations described herein. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing carrier aggregation, the method comprising: determining that a wireless device attached to an access node is: a high-power class wireless device based on a capability of the wireless device to transmit at a power level greater than a standard power level utilized by other wireless devices assigned to a standard power class, capable of operating in a carrier aggregation mode, and attached to a time-division-duplexing (TDD) carrier deployed by the access node; initiating the carrier aggregation mode for the high-power-class wireless device; and in response to determining that transmissions from the high-power-class wireless device are causing interference, instructing the access node to utilize a frequency-division-duplexing (FDD) carrier deployed by the access node as a primary carrier for the high-power-class wireless device in response to initiating the carrier aggregation mode and determining the high-power-class wireless device is attached to the TDD carrier, wherein the high-power-class wireless device uses the TDD carrier as a secondary carrier deployed by the access node in addition to the primary carrier.

2. The method of claim 1, wherein the access node deploys one or more TDD carriers.

3. The method of claim 2, wherein the high-power class wireless device is attached to a first TDD carrier of the one or more TDD carriers as the secondary carrier.

4. The method of claim 3, further comprising triggering a handover of the high-power class wireless device to the FDD carrier prior to initiating the carrier aggregation mode.

5. The method of claim 3, further comprising instructing the access node to utilize the first TDD carrier as the secondary carrier for the high-power class wireless device.

6. The method of claim 2, further comprising instructing the access node to utilize all of the one or more TDD carriers as multiple secondary carriers for the high-power class wireless device.

7. The method of claim 1, further comprising utilizing the FDD carrier for transmitting control information between the high-power class wireless device and the access node device.

8. The method of claim 1, wherein the capabilities of the wireless device are received from a power capabilities report from the wireless device.

9. The method of claim 8, wherein the power capabilities report is received from the wireless device in an attach request.

10. A system for performing carrier aggregation in a wireless network, the system comprising an access node configured to deploy a frequency-division-duplexing (FDD) carrier and at least one time-division-duplexing (TDD) carrier; and a processing node communicably coupled to the access node, the processing node being configured to perform operations comprising: identifying a wireless device as a high-powered wireless device attached to the access node based on a capability of the wireless device to transmit at a power level greater than a standard power level utilized by other wireless devices assigned to a standard power class; determining that the high-powered wireless device is capable of operating in a carrier aggregation mode; determining that the high-powered wireless device is attached one of the TDD carriers deployed by the access node; and in response to determining that transmissions from the high-powered wireless device are causing interference, instructing the access node to communicate with the high-powered wireless device in the carrier aggregation mode utilizing the FDD carrier as a primary carrier and the TDD carrier as a secondary carrier based on identifying the high-powered wireless device, determining that the high-powered wireless device is capable of operating in carrier aggregation mode, and determining that the high-powered wireless device is attached to one of the TDD carriers deployed by the access node.

11. The system of claim 10, wherein identifying the high-powered wireless device comprises obtaining a power class of the high-powered wireless device.

12. The system of claim 10, wherein the carrier aggregation mode enables the high-powered wireless device to utilize resources from the FDD carrier and the at least one TDD carrier.

13. The system of claim 12, wherein the resources from the FDD carrier are utilized for control transmissions.

14. The system of claim 12, wherein the resources from the FDD carrier are utilized for uplink transmissions from the high-powered wireless device.

15. The system of claim 10, wherein the instructions further comprise triggering a handover of the high-powered wireless device to the FDD carrier.

16. A processing node for performing carrier aggregation in a wireless network, the processing node being configured to perform operations comprising: determining that uplink transmissions from a high-powered wireless device attached to an access node are causing an interference to one or more standard-powered wireless devices, the high-power wireless device having a capability to transmit at a power level greater than a standard power level utilized by the one or more standard-powered wireless devices, wherein the high-powered wireless device and the one or more standard-powered wireless devices are attached to a time-division-duplexing (TDD) carrier deployed by the access node; triggering a handover of the high-powered wireless device to a frequency-division-duplexing (FDD) carrier deployed by the access node in response to determining that the uplink transmissions from the high-powered device are causing interference; and instructing the access node and the high-powered wireless device to utilize resources of the FDD and the TDD carriers deployed by the access node, wherein the FDD carrier functions as a primary carrier and at least one TDD carrier functions as a secondary carrier.

17. The processing node of claim 16, wherein the resources of the FDD carrier are used to transmit uplink signals from the high-powered wireless device to the access node device.

18. The processing node of claim 16, wherein triggering the handover is performed upon the interference meeting a threshold interference.

19. The processing node of claim 16, wherein the handover is triggered by transmitting adjusted handover thresholds to the high-powered wireless device.

20. The processing node of claim 19, wherein the adjusted handover thresholds comprise a lowered signal level threshold associated with the FDD carrier and a higher signal level threshold associated with the TDD carrier.

* * * * *